| United States Patent [19]
Rowe

[11] 4,419,487
[45] Dec. 6, 1983

[54] TOUGHENED POLYESTER RESINS

[75] Inventor: Eugene H. Rowe, Moab, Utah

[73] Assignee: The B. F. Goodrich Company, Akron, Ohio

[21] Appl. No.: 370,769

[22] Filed: Apr. 22, 1982

Related U.S. Application Data

[63] Continuation-in-part of Ser. No. 156,849, Jun. 5, 1980, abandoned.

[51] Int. Cl.$^3$ .................................................. C08L 67/06
[52] U.S. Cl. ........................................ 525/38; 525/39; 525/40; 525/42; 525/44; 525/49
[58] Field of Search ................. 525/39, 44, 38, 169, 525/171, 531, 42; 528/113, 115, 363, 365

[56] References Cited

U.S. PATENT DOCUMENTS

| | | | |
|---|---|---|---|
| 2,634,251 | 4/1953 | Kass | 528/192 X |
| 2,652,342 | 9/1953 | Gleason | 106/252 X |
| 3,231,634 | 1/1966 | Wismer et al. | 525/171 |
| 3,674,893 | 7/1972 | Nowak et al. | 525/112 X |
| 3,718,714 | 2/1973 | Comstock et al. | 525/170 |
| 3,806,490 | 4/1974 | Kajiura et al. | 525/447 X |
| 3,892,819 | 7/1975 | Najvar | 525/531 X |
| 3,928,491 | 12/1975 | Waters | 525/531 X |
| 4,020,036 | 4/1977 | South | 525/171 X |
| 4,085,018 | 4/1978 | Ariga et al. | 525/531 X |
| 4,111,770 | 9/1978 | Najvar | 525/531 X |
| 4,288,571 | 9/1981 | Comstock et al. | 525/169 X |

OTHER PUBLICATIONS

Mark et al., *Encyclopedia of Polymer Science and Technology, Interscience*, 1965, New York, vol. 2, pp. 701, 709, 732 and 733.

*Primary Examiner*—Earl A. Nielsen
*Attorney, Agent, or Firm*—George A. Kap

[57] ABSTRACT

Unsaturated polyester resins are rendered less brittle without significantly deteriorating other physical properties by reacting therewith 0.1 to 25 parts of a carboxyl terminated reactive liquid polymer, preferably poly(-butadiene-acrylonitrile), per 100 parts of the polyester resin.

10 Claims, No Drawings

TOUGHENED POLYESTER RESINS

REFERENCE TO A RELATED APPLICATION

This application is a continuation-in-part of application Ser. No. 156,849 entitled "Toughened Polyester Resins" that was filed June 5, 1980, now abandoned.

BACKGROUND OF THE DISCLOSURE

Principal applications of thermosetting unsaturated polyester resins include surface coatings and molding compositions which usually contain reinforcements, such as glass fibers. Such molding compositions are especially suited for the production of reinforced plastics. Among the many articles made from reinforced unsaturated polyester resins, the more spectacular are boat hulls and automobile bodies.

Since the unsaturated polyester resins are inherently brittle, attempts have been made in the past to overcome this disadvantage by incorporating plasticizers or flexibilizers, or other substances. Addition of components to polyester resins to improve toughness thereof has often proved to be unsuccessful due mostly to a significant deterioration of mechanical properties or incompatibility of such components with the polyester resins. It is, therefore, desirable to develop modified polyester resins which are toughened for crack and/or impact resistance by incorporating a compatible component which does not signicantly contribute to deterioration of thermal or mechanical properties of the polyester resins.

SUMMARY OF THE INVENTION

This invention relates to polyester resins which contain a small amount of a carboxyl terminated reactive liquid polymer (CTRLP) to improve toughness, i.e., crack and/or impact resistance, thereof, as measured by, for instance, the fracture surface energy or drop dart impact test. More specifically, this invention relates to a composition of matter comprising a reaction product of a polyester resin and a carboxyl terminated reactive liquid polymer, amount of the liquid polymer being sufficient to improve toughness of said composition without significantly deteriorating other physical properties.

DETAILED DESCRIPTION OF THE INVENTION

Pursuant to this invention, toughened polyester resins are prepared by reacting a polyester resin with a sufficient amount of a carboxyl terminated liquid polymer (CTRLP). Relative amounts of ingredients are 0.1 to 25 parts CTRLP per 100 parts of an unsaturated polyester resin, preferably 0.5 to 15 parts by weight. Suitable unsaturated polyester resins are polyesters of polyhydric alcohols and polycarboxylic acids or their anhydrides. Unsaturated polyesters so defined include esters of, for example, maleic, fumaric, itaconic, mesaconic, tetrahydro phthalic, phthalic, chlorinated phthalic, isophthalic, succinic, adipic, sebacic, or terephthalic acids, and mixtures thereof. The alcohols that are reacted with the acids include diols such as trimethylene glycol, lower polyalkylene glycols, butylene glycols, hexylene glycols, cyclohexane diols, xylylene glycols, ethylene glycol, propylene glycol, pentaerythritol, di-(hydroxy propyl) ether of 2,2-di(4-hydroxyphenol)propane, di-(hydroxyethyl)ether of 2,2-di(4-hydroxyphenyl)butane, and mixtures thereof. Preferred alcohols are dihydric which conform to the formula

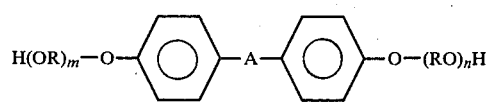

where R is an alkylene group of 2 to 3 carbon atoms, A is a 2-alkyl diene group of 3 to 4 carbon atoms, with m and n each being at least one and the sum of m and n is not over 6.

Of the unsaturated polyesters conforming to the definition herein, preferred unsaturated polyester resins for purposes herein are maleates and fumarates of symmetrical di-(hydroxyalkyl)ethers of 2,2-di(4-hydroxyphenyl)propane which can be in halogenated form. Preferred polyesters also include divinyl esters of diglycidyl ether of bisphenol A and acrylic or methacrylic acid. Such resins conform to the formula

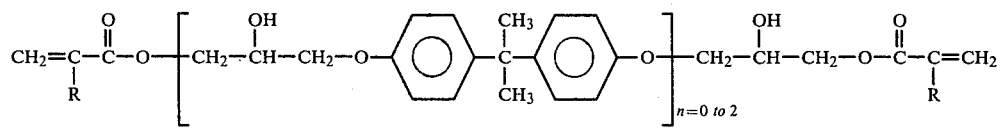

where the Rs are individually selected from hydrogen, and lower alkyl such as methyl, ethyl and propyl. Specific resins of this type are Dow's Derakane ® vinylester resins. Specific examples of preferred polyester resins of bisphenol A and fumaric acid are Atlas Chemical's Atlac ® resins, such as Atlac 711-05A which contains a chemically bound halogen. Preparation of the polyester resins is well known in the art.

Commercial polyester resins for molding or laminating applications are sold as solutions thereof in a solvent comprising at least one polymerizable monomer which is copolymerizable with the polyester resin. The polymerizable monomer not only acts as a solvent but also copolymerizes with the unsaturated groups along the polyester chain. Polymerizable monomers which can be used in this invention include polymerizable vinylidene compounds having at least one terminal $CH_2<$ group and containing 2 to 12 carbon atoms, preferably 3 to 10 carbon atoms. A wide variety of these compounds are known including both aliphatic and aromatic unsaturated hydrocarbons and hydrocarbon derivatives, such as esters, acids and nitriles. Examples of suitable polymerizable monomers are styrene, methyl styrene, acrylonitrile, methyl acrylate, methyl methacrylate, vinyl toluene, vinyl acetate, allyl esters of phthalic, adipic, maleic, malonic, and cyanuric acids, and mixtures of such monomers. Styrene and methyl styrene are particularly useful polymerizable monomers. Amount of the polymerizable monomer solvent relative to the polyester resin can be on the order of 40/60.

The liquid polymer employed is a carboxyl-terminated polymer having a polymeric backbone consisting of carbon-carbon or carbon-oxygen linkages. The polymer has an average of from about 1.6 to about 2.4 carboxyl (COOH) groups per molecule. Preferably, the polymer has two carboxyl groups, one located at each of the terminal ends of the polymer molecule. The liquid polymer can additionally have carboxyl groups located pendent to the polymer backbone. The carboxyl content of the polymers ranges from about 0.5% to about 10% by weight, based upon the weight of the polymer, and more preferably from about 1% to about 6% by weight. Carboxyl content can be determined by titration of a polymer solution to a phenolphthalein end point using standardized alcoholic KOH.

The liquid polymers have a molecular weight of from about 600 to about 10,000, as measured using a Mercolab Vapor Pressure Osmometer. The polymers are more conveniently described by their bulk viscosity. The liquid polymers have a bulk viscosity of from about 500 centipoises to about 2,000,000 centipoises, measured at 27° C. using a Brookfield Model LVT viscometer with spindle No. 7 at 0.5 to 100 rpm. More preferred, the polymers have a bulk viscosity from about 5000 centipoises to about 1,000,000 centipoises. Polymers having a bulk viscosity from about 10,000 centipoises to about 700,000 centipoises are particularly useful.

The liquid carboxyl terminated reactive polymers have polymeric backbones comprising carbon-carbon linkages or carbon-oxygen linkages. Polymers having carbon-carbon linkages are preferred. These liquid carboxyl-terminated polymers can contain interpolymerized units of one or more vinylidene monomers selected from (a) monoolefins containing 2 to about 14 carbon atoms such as ethylene, propylene, isobutylene, 1-butene, 1-pentene, 1-hexene, 1-dodecane, and the like; (b) dienes containing 4 to about 10 carbon atoms such as butadiene, isoprene, 2-isopropyl-1,3-butadiene, chloroprene, and the like; (c) vinyl and allyl esters such as vinyl acetate, vinyl propionate, allyl acetate, and the like; (d) vinyl and allyl ethers such as vinyl methyl ether, allyl methyl ether, and the like; and (e) acrylates of the formula

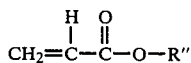

wherein R" is hydrogen, an alkyl radical containing 1 to about 18 carbon atoms or an alkoxyalkyl, and alkylthioalkyl, or cyanoalkyl radical, each containing 2 to about 12 carbon atoms. Examples of such acrylates are ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, and the like. Often two or more types of these polymerized monomeric units are contained in the polymeric backbone.

The vinylidene monomers listed above are readily polymerized in major amounts with up to 50% by weight (of the total weight of the polymer) of (f) vinyl aromatics such as styrene, α-methyl styrene, vinyl toluene, and the like; (g) vinyl nitriles such as acrylonitriles, methacrylonitrile, and the like; (h) methacrylates and ethacrylates such as methyl methacrylate, ethyl methacrylate, octyl methacrylate, ethyl ethacrylate, and the like; and (i) divinyls and diacrylates such as divinyl benzene, divinyl ether, diethylene glycol diacrylate, and the like. Liquid polymer compositions containing liquid carboxyl-containing polymers comprised of over 50% to 100% by weight of interpolymerized units of a vinylidene monomer(s) listed in (a) to (e) with up to 50% by weight of interpolymerized units of a vinylidene monomer(s) listed in (f) to (i), are within the scope of this invention.

These liquid polymers can be prepared by free-radical polymerization using carboxyl-containing initiators and/or modifiers as disclosed in U.S. Pat. No. 3,285,949 and German Pat. No. 1,150,205, and by solution polymerization using lithium metal or organometallic compounds and post-treating the polymers to form carboxyl groups, as disclosed in U.S. Pat. Nos. 3,125,716 and 3,431,235. The polymers can also be prepared by reacting liquid polymers having other than terminal carboxyl groups with compounds so as to yield carboxyl groups. For example, carboxyl-terminated polymers can be prepared from hydroxyl-terminated polymers by reaction with dicarboxyl compounds. Mercaptan- and amine- or amide-terminated polymers can be reacted with unsaturated carboxylic acids or anhydrides to yield carboxyl-terminated polymers. Halogen-terminated polymers can be reacted with unsaturated anhydrides in the presence of Lewis acids to yield carboxyl groups. Hence, it is seen that the method of preparing the liquid carboxyl-terminated polymer is not critical to the invention, as long as the polymer has at least terminal carboxyl groups and a polymeric backbone consisting of carbon-carbon or carbon-oxygen linkages.

Examples of liquid carboxyl terminated polymers are carboxyl terminated polyethylene, polyisobutylene, polybutadiene, polyisoprene, poly(butadiene-acrylonitrile), poly(butadiene-styrene), poly(ethyl acrylate), poly(ethyl acrylate-n-butyl acrylate), poly(n-butyl acrylate-acrylonitrile), poly(butyl acrylate-styrene), poly(butadieneacrylonitrile-acrylic acid), especially carboxyl-terminated liquid polymers that contain polybutadiene in the backbone that is substantially 1,4-polybutadiene. Preferred liquid polymer is carboxyl terminated poly(butadiene acrylonitrile) containing about 10 to 35% acrylonitrile, preferably 15 to 30%.

Carboxyl-terminated poly(butadiene-acrylonitrile) and carboxyl-terminated poly(butadiene-styrene) polymers were found to be especially useful. These polymers contain about 5% to about 40% by weight of acrylonitrile or styrene, about 0.5% to about 10% by weight of carboxyl, and about 50% to about 95% by weight of butadiene, based on the weight of the polymer.

As is well known, butadiene in the carboxyl-terminated liquid polymers can be polymerized by either the 1,2 or the 1,4 mode of addition polymerization, depending on the type of catalyst and conditions employed. The two types of polybutadienes have the following structures:

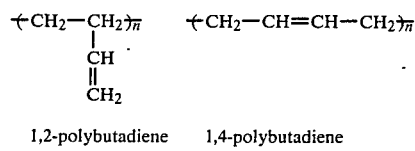

1,2-polybutadiene    1,4-polybutadiene

The pendant vinyl group on the 1,2-polybutadiene leads to self-crosslinking on curing that results in a thermosetting material. For this reason, carboxyl terminated liquid polymer with the 1,2-polybutadiene backbone are especially suited for applications such as coatings, films, casting materials, and adhesives. The liquid polymers with 1,4-polybutadiene backbone, on the other hand, do not have a pendant group and for this reason, undergo chain extension on curing producing a thermoplastic material. A curing agent can be added to this material to cure same since it will not cure on its own as will 1,2-polybutadiene. Due to their inherent properties, liquid polymers with 1,4-polybutadiene backbone are suitable to improve impact resistance of brittle materials, such as unsaturated polyester resins.

It should be understood that particular type of polymerization of butadiene does not produce either all 1,2-polybutadiene or all 1,4-polybutadiene. Using free-radical polymerization of butadiene, the product contains about 20% 1,2-polybutadiene and about 80% 1,4-polybutadiene. Same applies to preparation of 1,2-polybutadiene. To acknowledge this fact, the 1,4-product will be referred to as being substantially all 1,4-polybutadiene. Also, to distinguish over prior art that discloses liquid polymers that contain polybutadiene of the 1,2-configuration in the backbone, the backbone will also be defined as being devoid of a substantial amount of 1,2-polybutadiene.

The modified unsaturated polyester resins described herein can be compounded with various ingredients depending on the type of application contemplated. These ingredients are typical ingredients used in compounding. Standard levels of these ingredients are employed, such levels being well known in the art.

The modified unsaturated polyester resins can be fabricated by admixing therewith an initiator or catalyst, usually a peroxide or hydroperoxide and impregnating fiber or fabric with the resin. This combination is placed in a mold or a form and heat and pressure are applied varying from 0.5 to 250 psi and 20° to 60° C. to cure the resin. Curing conditions depend on many factors, including the specific catalyst used. Suitable catalyst system comprises any of the well-known free-radical catalysts and, optionally, a catalyst promoter or accelerator. Examples of free-radical catalysts and peroxides and hydroperoxides such as benzoyl peroxide, cumene peroxide and hydroperoxide, lauroyl peroxide, t-butyl peroxide and hydroperoxide, methylethyl ketone peroxide, and the like; azobisisobutylronitrile, and t-butyl perbenzoate, and the like. Catalyst promoters or accelerators include metal salts such as cobalt, tin, and lead salts like cobalt naphtheneate or octoate; and amines such as N,N-dimethylaniline, triethylamine, triethanolamine, and the like. The total weight of the free-radical catalyst system, whether or not a catalyst promoter is used, is from about 0.1 part to about 5 parts, more preferably from about 0.5 part to about 3 parts by weight based upon 100 parts by weight of the unsaturated polyester resin.

In order to evaluate the compositions of this invention for toughness and other properties, standard industry tests were used. ASTM tests were used for conventional mechanical properties such as D-790 for flexure and D-638 for tension, both with nominal 6.35 mm thick samples. Other tests were used to measure shrinkage in the mold and Barcol hardness. Tensile strength data was obtained following procedure of ASTM-D-638-77a test and heat distortion temperature evaluation was made pursuant to ASTM-D-648-72 test. Fracture toughness was evaluated by the double cantilever cleavage test for fracture surface energy and/or the Gardner dart impact test.

In the cleavage test, a crack is propagated along the median plane of a double cantilever specimen by tensile forces applied at the free ends. The 0.38 mm wide slot confines the crack so that it propagates through a specific volume in a stable manner. The dimensions of double cantilever test specimen are illustrated in the appendix of the article by L. J. Broutman and F. J. McGarry in *J. Appl. Polymer Science*, vol. 9, p. 589 (1965). The fracture surface energy $\alpha$ can be calculated from the equation $\alpha = A/2wl$ where $A$ = the area under load-deflection curve; $w$ = crack width; $l$ = crack length. To obtain fracture surface energy, the cleavage specimen is loaded at a constant cross head rate of 2.5 mm per minute using an Instron Testing machine. The load versus deflection curve is obtained using the strip chart recorder.

For the Gardner impact test, an instrument is used which comprises a base plate, a round-nosed steel rod impact weight, a slotted tube having inch-pound graduations in which the rod is lifted and dropped, and a bracket to hold the tube in a vertical position. Impact resistance is determined by subjecting either side of a sample panel to an impact of up to 320 inch-pounds, depending upon the weight dropped. The sample panel is placed over a 12.7 mm hole in the base plate; the steel rod weight is raised by lifting an attached pin until the pin coincides with the desired inch-pounds graduation mark on the slotted tube, and then dropped. The sample panel is examined for cracking or failure after each impact. The test used a 6.35 mm radius dart on a 6.35 mm thick sample panel. A two-pound weight was dropped from various ascending heights onto the ring supported sample until catastrophic failure occurred.

The following examples illustrate preparation of typical resins of this invention and superior mechanical properties thereof as reflected by fracture surface energy tests and other tests which are designed to evaluate brittleness and other properties of such resins.

EXAMPLE 1

Samples of polyester resins were prepared by mixing Atlac ®711-05A polyester resin with Hycar CTBN, 1300X13, carboxyl-terminated reactive liquid polymer in the indicated amounts. Atlac polyester resin 711-05A is a reaction product of a bisphenol A and fumaric acid containing bound halogen which is not diluted with any polymerizable monomer solvent, such as styrene, unless the resin is to be used in spray operations, in which case, up to 50% additional styrene can be used. In this example, no additional styrene was used. The Hycar liquid polymer was carboxyl-terminated poly(butadiene-acrylonitrile) which contains 27% acrylonitrile, has functionality of 1.85, molecular weight of 3,500, and 2.40% carboxyl content. To the mixed liquid ingredients was added 0.5 part of cobalt naphthenate in the form of a 10% solution in styrene and mixed for a quarter hour, and thereafter, 2.0 parts of methyl ethyl ketone peroxide was added and mixed for about three minutes. The resulting liquid was poured into vertical mold to produce a 6.35×254×229 mm plaque, cured for one-half hour at 60° C. and then for one hour at 120° C. Specimens were cut to the prescribed size and subjected to the tests. A control sample was also prepared in the same manner but without any reactive liquid polymer. Ingredients of the modified and control polyester resins, and test results for the test specimens and the control are given in Table I, below, where amounts stated are in parts by weight, unless otherwise specified:

TABLE I

|  | Sample A | Sample B |
| --- | --- | --- |
| Polyester Resin Atlac 711-05A | 100 | 100 |
| Liquid Polymer, Hycar CTBN, 1300 × 13 | — | 8.0 |
| Cobalt Naphthanate (10% solution in styrene) | 0.5 | 0.5 |
| Methyl Ethyl Ketone Peroxide | 2.0 | 2.0 |
| Barcol Hardness | 30 | 10 |
| Gardner Impact, J | 1.1 | 0.4 |
| Fracture Surface Energy, J/m$^2$ | 105 | 292 |
| Heat Distortion Temp., °C. | 105 | 109 |
| Flexural Strength, MPa | 39.3 | 82.6 |
| Flexural Strain, m/m | 0.012 | 0.042 |
| Flexural Modulus, GPa | 3.9 | 2.9 |
| Flexural Energy, J | 0.215 | 1.48 |

Sample A, above, is the control sample since it did not contain any reactive liquid polymer. On the basis of data presented above, it should be apparent that flexural strength, i.e., fracture surface energy, was improved by the addition of the reactive liquid polymer with no reduction in heat distortion temperature.

EXAMPLE 2

Additional samples were prepared, as in Example 1, using Derakane 411-45 polyester resin and liquid polymer Hycar CTBN 1300X8, in place of the resins used in Example 1. The Derakane resin is a vinyl ester resin which can cure without a monomer present due to the presence of reactive sites only at the ends of the molecule. The Hycar resin is a carboxyl-terminated poly(butadiene-acrylonitrile) resin which has acrylonitrile content of 17%, functionality of 1.85, molecular weight of 3,500, and carboxyl content of 2.37%. Ingredients of the modified and control polyester resins and test results are given in Table II, below, where amounts indicated are in parts by weight, unless otherwise noted:

TABLE II

|  | Sample C | Sample D |
| --- | --- | --- |
| Polyester Resin Derakane 411-45 | 100 | 100 |
| Liquid Polymer Hycar CTBN 1300 × 8 | — | 4.0 |
| Cobalt Naphthanate (10% in styrene) | 0.5 | 0.5 |
| Methyl Ethyl Ketone Peroxide | 2.0 | 2.0 |
| Barcol Hardness | 27 | 28 |
| Gardner Impact, J | 1.3 | 1.5 |
| Fracture Surface Energy, J/m$^2$ | 178 | 332 |
| Tensile Strength, MPa | 50.7 | 52.5 |
| Tensile Elongation, % | 1.98 | 2.35 |
| Tensile Modulus, GPa | 3.02 | 2.80 |

Test results given in Table II, above, indicate that crack resistance, as measured by the fracture surface energy, showed improvement with little effect on other mechanical properties.

EXAMPLE 3

Additional samples of polyester resins were prepared, as described in Example 1, using the same ATLAC 711-05A polyester resin as in Example 1, and various CTRLPs. The polyester resin used herein was a reaction product of Bisphenol A and fumaric acid containing bound halogen. Carboxyl-terminated reactive liquid polymers used included Hycar CTB 2000X156, a carboxyl terminated polybutadiene; Hycar CTBN 1300X15, a carboxyl terminated poly(butadiene-acrylonitrile); Hycar CTBN 1300X8, a carboxyl terminated poly(butadiene-acrylonitrile); Hycar CTBNX 1300X9, a carboxyl terminated poly(butadiene-acrylonitrile-acrylic acid) with up to a couple of percent of acrylic acid, polymerized therein to provide pendant carboxyl groups. Certain properties of these CTRLPs are given in Table III, below:

TABLE III

|  | Carboxyl Content | Molecular Weight | Functionality | Acrylonitrile Content, % |
| --- | --- | --- | --- | --- |
| CTB(200 × 156) | 1.9 | 4,800 | 2.01 | 0 |
| CTBN(1300 × 15) | 2.47 | 3,500 | 1.9 | 10 |
| CTBN(1300 × 8) | 2.37 | 3,500 | 1.85 | 17.5 |
| CTBN(1300 × 13) | 2.40 | 3,500 | 1.85 | 25.5 |
| CTBNX(1300 × 9) | 2.93 | 3,500 | 2.3 | 17.5 |
| CTBNX(1300 × 18) | 3.0 | 3,500 | 2.3 | 21.5 |

Test results on the various samples of modified polyester resins, prepared as already described, are given in Table IV, below:

TABLE IV

| Additive | Phr | Barcol Hardness | Gardner Impact (J) | Fracture Surface Energy (J/m$^2$) |
| --- | --- | --- | --- | --- |
| None | 0 | 34 | 1.24 | 102 |
| CTB(2000 × 156) | 4 | — | 0.57 | 57.7 |
| CTBN(1300 × 15) | 4 | — | 0.68 | 78.8 |
| CTBN(1300 × 15) | 8 | — | 0.34 | 119 |
| CTBN(1300 × 8) | 4 | 17 | 1.13 | 217 |
| CTBN(1300 × 8) | 8 | — | 0.57 | 210 |
| CTBN(1300 × 13) | 4 | 30 | 1.24 | 220 |
| CTBN(1300 × 13) | 8 | 10 | 0.47 | 306 |
| CTBN(1300 × 13) | 2 | 38 | 1.58 | 140 |
| CTBN(1300 × 13) | 6 | 25 | 1.47 | 194 |
| CTBNX(1300 × 9) | 4 | 11 | 1.24 | 210 |
| CTBNX(1300 × 9) | 8 | — | 1.13 | 242 |
| CTBN(1300 × 18) | 4 | 25 | 1.36 | 140 |
| CTBN(1300 × 18) | 8 | — | 1.70 | 196 |

The above results indicate significant improvement in fracture surface energy for samples containing carboxyl terminated reactive liquid polymers compared to a control sample without such a liquid polymer. There also appears to be a direct correlation between acrylonitrile content and fracture surface energy. This is particularly evident from samples containing 4 phr CTB(200×156), 4 phr CTBN(1300×15) and 8 phr CTBN(1300×15). Gardner impact, however, appears to have an inverse relationship with respect to the amount of the liquid polymer employed except for CTBNX(1300×18).

I claim:

1. Composition of matter comprising a reaction product of an unsaturated polyester resin and a carboxyl-terminated reactive liquid polymer wherein said polyester resin is selected from polyesters of polyhydric alcohols and carboxylic acids or their anhydrides, amount of said liquid polymer being sufficient to improve toughness in terms of crack and/or impact resistance of said composition without significantly deteriorating other mechanical properties, said liquid polymer having a backbone comprising one or more polymerized vinylidene monomers selected from (a) monoolefins containing 2 to 14 carbon atoms, (b) dienes containing 4 to 10 carbon atoms, (c) vinyl and allyl esters, (d) vinyl and allyl ethers, and (e) acrylates of the formula

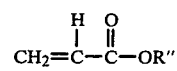

where R″ is hydrogen, alkyl radical of 1 to 18 carbon atoms or an alkoxyalkyl, alkylthioalkyl, or cyanoalkyl radical containing 2 to 12 carbon atoms; the polybutadiene in said liquid polymer containing polybutadiene in the backbone being substantially 1,4-polybutadiene.

2. Composition of claim 1 wherein said liquid polymer has a carboxyl content of 0.5 to 10 weight percent based on the weight of said liquid polymer, amount thereof is 0.5 to 15 parts per 100 parts of said polyester resin, and its bulk viscosity of about 500 to 2,000,000 cps measured at 27° C. using a Brookfield Viscometer, said liquid polymer is selected from carboxyl-terminated polyethylene, polyisobutylene, polybutadiene, polyisoprene, poly(butadiene-acrylonitrile), poly(butadiene-styrene), poly(ethyl acrylate), poly(ethyl acrylate-n-butyl acrylate), poly(n-butyl acrylate-acrylonitrile), poly(butyl acrylate-styrene), and poly(butadiene-acrylonitrile-acrylic acid), the polybutadiene in said liquid polymer containing polybutadiene in the backbone being substantially 1,4-polybutadiene.

3. Composition of claim 2 wherein said polyhydric alcohols are selected from dihydric alcohols conforming to the formula

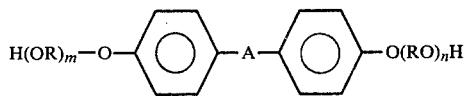

where R is an alkylene group of 2 to 3 carbon atoms, A is a diene group of 3 to 4 carbon atoms, and m and n each being at least one with the sum of m and n not being over 6; said carboxylic acids are selected from maleic, fumaric, itaconic, mesaconic, endomethylene, tetrahydro phthalic, phthalic, chlorinated phthalic, isophthalic, succinic, adipic, sebacic, terephthalic, and mixtures of such acids; and said liquid polymer has an average of 1.6 to 2.4 carboxyl groups per molecule, bulk viscosity of 5000 to 1,000,000 cps, polymeric backbone consisting of carbon-carbon linkages, and amount thereof being 0.1 to 25 parts per 100 parts of said polyester resin.

4. Composition of claim 1 wherein said polyester resin is selected from halogenated and unhalogenated maleates and fumarates of symmetrical di-(hydroxyalkyl)-ethers of 2,2-di(4-hydroxyphenyl) propane, and diesters of diglycidyl ether of Bisphenol A and acrylic or methacrylic acid; and said liquid polymer has an average of about 1 to 4 weight percent carboxyl content.

5. Composition of claim 4 wherein said liquid polymer contains 1,4-polybutadiene in the backbone and 10 to 35 weight percent acrylonitrile, amount of said liquid polymer being 0.5 to 15 parts per 100 parts of said polyester resin.

6. Composition of claim 5 wherein said liquid polymer contains 15 to 30 weight percent acrylonitrile.

7. Composition of claim 5 wherein said liquid polymer also contains polymerized therein up to a couple of percent of acrylic acid.

8. Composition of claim 5 wherein said polyester resin is in admixture with a polymerizable monomer.

9. Composition of claim 8 wherein said polymerizable monomer is selected from vinylidene compounds having at least one terminal $CH_2<$ group and containing 2 to 12 carbon atoms.

10. Composition of claim 4 wherein said liquid polymer is selected from carboxyl-terminated poly(butadiene-acrylonitrile) and poly(butadiene-acrylonitrile-acrylic acid) wherein the polybutadiene is substantially of the 1,4-structure.

* * * * *